April 2, 1929.  H. C. GRAEBE  1,707,949
PROCESS FOR HUMIDIFYING COTTON SEED MEATS
Filed May 28, 1925
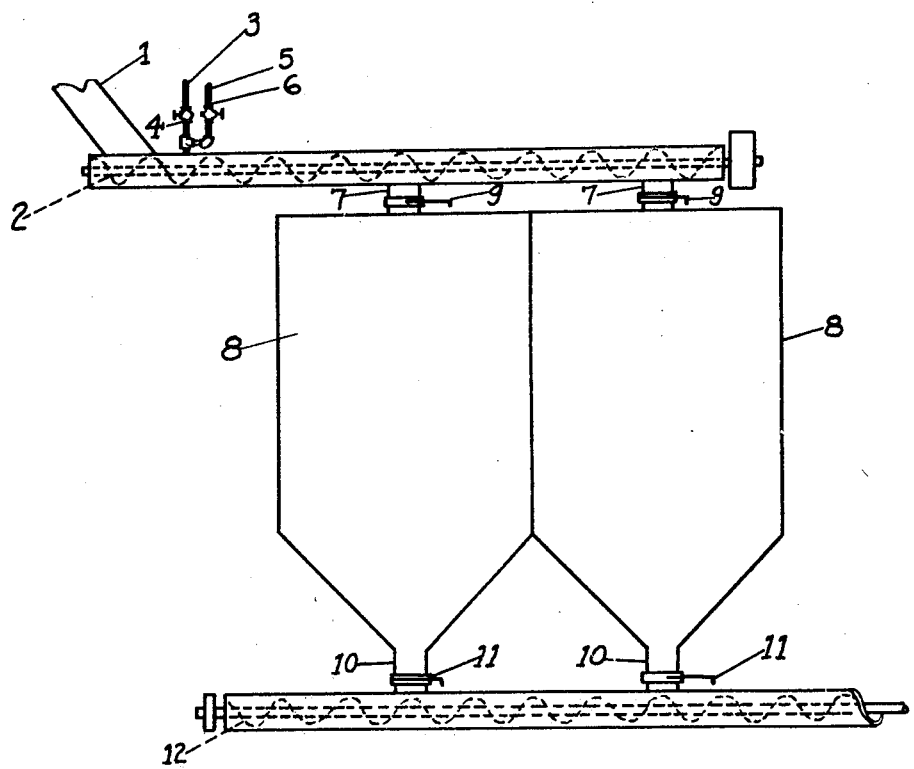
INVENTOR
Herman C. Graebe
BY Allen & Allen
ATTORNEYS Patented Apr. 2, 1929.

1,707,949

UNITED STATES PATENT OFFICE.

HERMAN C. GRAEBE, OF ATLANTA, GEORGIA, ASSIGNOR TO THE PROCTER AND GAMBLE COMPANY, OF CINCINNATI, OHIO, A CORPORATION OF OHIO.

PROCESS FOR HUMIDIFYING COTTONSEED MEATS.

Application filed May 28, 1925. Serial No. 33,550.

My invention relates to processes for treating cotton seed meats in general, and particularly to a novel process for the humidification of cotton seed meats prior to the step in which the oil is actually pressed from the meats.

It is the object of my invention to treat oil bearing cotton seed meats with steam or water and to allow the mass, thus treated, to stand in bulk for such time before pressing as has been found will result in a material increase in the yield of oil produced.

A number of methods have been tried in the past to introduce moisture into cotton seed meats by spraying water or wet steam into conveyors containing the meats in bulk, but none of these methods has resulted in a material increase in the yield of oil, because the distribution of the moisture within the cells of the nuts and seeds does not seem to ever have been sufficiently uniform to produce any unusual yield.

Cotton seed meats having a relatively high moisture content have been found to yield their oil much more readily than dry meats, and my process has as its object the production of a close approach to nature in an artificial humidified grade of meats having a high moisture content with the moisture so incorporated in the meats so as to cause a high yield of oil in the pressing operation.

I have found, however, that if the meats are sprayed with water or steam or both in such a way as to uniformly distribute the moisture, and the vegetable material thus treated is then retained for a period of time of approximately one hour or more before the seeds are crushed and pressed, that a very material increase in the yield of oil will result.

A convenient apparatus for carrying out my novel process is shown in the drawing in which:

The figure is a diagrammatic section of a suitable apparatus.

Generally indicated at 1 is shown a chute through which the nuts or seeds are discharged into the enclosed screw conveyor indicated at 2. The steam pipe 3 with valve 4 may be opened and steam thus discharged within the conveyor. The water line 5 may be connected into the same line which discharges within the conveyor as controlled by the valve indicated at 6. Thus the meats may be thoroughly mixed with water and steam before discharging into the storage tanks. Chutes indicated at 7 connect the bottom of the conveyor with tanks 8 and the openings in the chutes are controlled by the slides 9. The tanks are also provided at the bottoms with chutes 10 with slides 11 which connect the tanks with the enclosed conveyor 12 through which the seeds or nuts are carried to the crusher or other apparatus in which the moistened oily meat is treated prior to the pressing operation.

The equipment diagrammatically shown is of course nothing more than a convenient arrangement of mechanism for carrying out my process and equivalents of the structure shown will readily occur to those skilled in the art.

The convenience of such an arrangement of tanks and conveyors will at once become apparent when it is considered that the conveyor discharging into the tanks furnishes a very convenient stage in the conveying of the seeds or nuts to the later steps in the process. At this point the seeds or nuts are being thoroughly mixed and the moisture which may be added is thoroughly mixed in the conveyor before the seeds or nuts are discharged into the storage tanks. I control the moisture and steam discharged from the pipes 3 and 5 so that there will be no excess of moisture or water to drop out later in the storage bins. By opening first one slide valve 9 until the tank is filled and then the other and having the size of the tanks of dimensions equivalent to the total amount of bulk meats which will be handled by the conveyor during the period which the moistened oily material is to be held in the tanks, a process results thereby in which there is no storage of one batch longer than another so that uniform results in the yield of oil may be obtained. As soon as one of the tanks is filled the bottom slide is opened to the outlet conveyor and the inlet conveyor is adjusted to discharge into the other tank. Thus a continuous supply may be provided to the conveyor.

As a specific example of my process, the following results were obtained with a ten thousand pound batch having a moisture content of 6.5%. I added at atmospheric pressure sufficient moisture in the form of water heated with open steam to about 175 degrees Fahrenheit to increase the moisture content to 11.5%. The batch was then discharged into a tank similar to the one indicated at 8 and allowed to stand for two hours. The pressing of the meats which had this humidifying and standing treatment, after rolling yielded a two per cent greater quantity of oil in pressing than a like quantity of meats of a similar grade which had been humidified but which had been rolled and pressed immediately thereafter.

Instead of using two tanks a larger number of units may be used the size of which may be readily figured from the amount of oily material to be handled and the time to which it is to be allowed to be exposed to moisture. The process may be continuous as long as at least an hour passes between the humidifying and the following steps in the pressing operation.

Having thus described my invention, what I claim as new and desire to secure by Letters Patent, is:

1. The step in the process of preparing cotton seed meats for extraction, which consists in continuously feeding cotton seed meats and supplying a regulated quantity of moisture during the feeding operation, then building up a supply of moistened meats and allowing the meats to stand for at least an hour before further feeding to subsequent steps in the process.

2. A step in preparing cotton seed meats for extraction, which consists in moistening the meats during a period of continuous feeding and then alternately allowing one batch to accumulate and stand for an hour while another is being accumulated and alternately discharging one accumulated supply and then another.

3. A step in preparing cotton seed meats for rolling and pressing which consists in continuously feeding a batch into an accumulating supply and allowing the supply to stand for at least an hour and supplying a continuously regulated quantity of moisture to the meats during the continuous feeding period.

HERMAN C. GRAEBE.